(12) United States Patent
Arif

(10) Patent No.: US 9,428,372 B2
(45) Date of Patent: Aug. 30, 2016

(54) SUPPORT ASSEMBLY

(75) Inventor: Maxwell Olgun Arif, Manjimup (AU)

(73) Assignee: EZI FIX MINING SOLUTIONS PTY LTD, Manjimup, Western (AU)

( * ) Notice: Subject to any disclaimer, the term of this patent is extended or adjusted under 35 U.S.C. 154(b) by 12 days.

(21) Appl. No.: 13/997,398

(22) PCT Filed: Jan. 3, 2012

(86) PCT No.: PCT/AU2012/000003
§ 371 (c)(1),
(2), (4) Date: Jun. 24, 2013

(87) PCT Pub. No.: WO2012/083388
PCT Pub. Date: Jun. 28, 2012

(65) Prior Publication Data
US 2013/0292233 A1 Nov. 7, 2013

(30) Foreign Application Priority Data

Dec. 24, 2010 (AU) .................................. 2010905663
Dec. 24, 2010 (AU) .................................. 2010905669

(51) Int. Cl.
*B65G 21/06* (2006.01)
*B66F 3/24* (2006.01)
(Continued)

(52) U.S. Cl.
CPC .................. *B66F 3/24* (2013.01); *B65G 21/02* (2013.01); *B65G 21/06* (2013.01); *B65G 39/12* (2013.01); *B65G 45/00* (2013.01); *B66F 3/08* (2013.01); *B65G 15/08* (2013.01)

(58) Field of Classification Search
CPC ................... B65G 39/10–39/12; B65G 21/06; B65G 3/24
See application file for complete search history.

(56) References Cited

U.S. PATENT DOCUMENTS 3,101,192 A * 8/1963 Stinson .................. B65G 21/04
 198/827
5,680,925 A * 10/1997 Gallagher .............. B65G 15/00
 198/861.1
(Continued)

FOREIGN PATENT DOCUMENTS

AU WO 2008/128291 * 10/2008 ............. B65G 39/00
CA 2216196 * 11/1997 ............. B65G 39/10
(Continued)

OTHER PUBLICATIONS

International Search Report for PCT/AU2012/000003, mailed Mar. 20, 2012; ISA/AU.
(Continued)

*Primary Examiner* — Thomas Randazzo
(74) *Attorney, Agent, or Firm* — Harness, Dickey & Pierce, P.L.C.

(57) ABSTRACT

The present invention provides a support assembly (11) for lifting a belt of a conveyor system. The support assembly (11) comprises an attachment assembly (15, 17) to releasably secure a support member (13) to a frame of a conveyor system. The attachment assembly (15, 17) comprising a lifting means (31). The lifting means moves the support member, in a synchronized manner, between a first position, wherein the support member is not in engagement with the belt, and a second position, wherein the support member supports the conveyor belt at a spaced distance from at least one conveyor roller located below the belt, allowing an operator to access the at least one roller.

29 Claims, 12 Drawing Sheets

(51) Int. Cl.
*B65G 39/12* (2006.01)
*B65G 45/00* (2006.01)
*B65G 21/02* (2006.01)
*B66F 3/08* (2006.01)
*B65G 15/08* (2006.01)

(56) References Cited

U.S. PATENT DOCUMENTS

| | | | | |
|---|---|---|---|---|
| 6,095,320 | A * | 8/2000 | DeMong | B65G 15/00 198/812 |
| 6,109,428 | A * | 8/2000 | Harm | B65G 15/00 198/841 |
| 6,244,428 | B1 * | 6/2001 | Atkins | B65G 39/12 198/823 |
| 8,186,651 | B2 * | 5/2012 | Dowling | B65G 15/00 254/124 |
| 2009/0236183 | A1 * | 9/2009 | Bordwell | B66F 7/20 187/234 |
| 2010/0224845 | A1 * | 9/2010 | Dowling | B65G 15/62 254/93 HP |

FOREIGN PATENT DOCUMENTS

| | | |
|---|---|---|
| CA | 2 216 196 A1 | 5/1999 |
| WO | WO-1997/030927 A1 | 8/1997 |
| WO | WO-2008/128291 A1 | 10/2008 |

OTHER PUBLICATIONS

International Preliminary Report on Patentability, mailed Jan. 25, 2013; IPEA/AU.

* cited by examiner

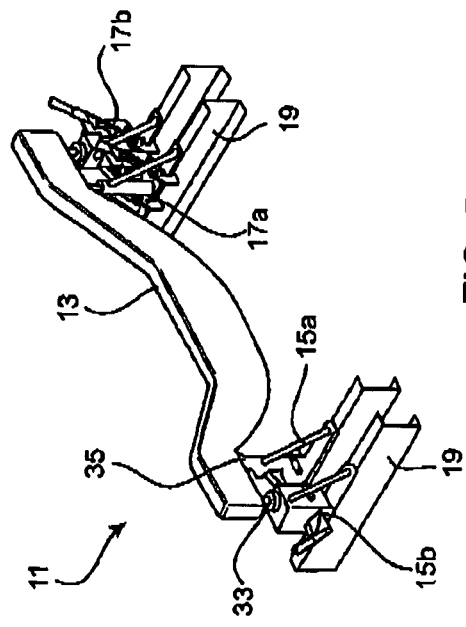
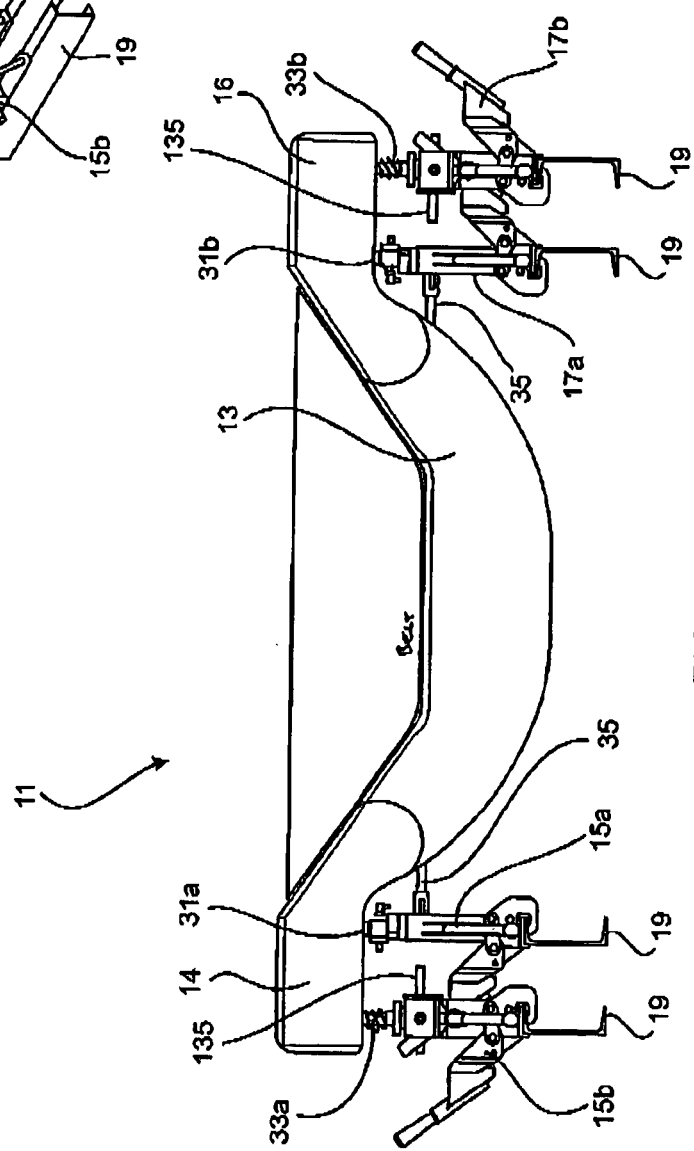
FIG. 5
FIG. 4

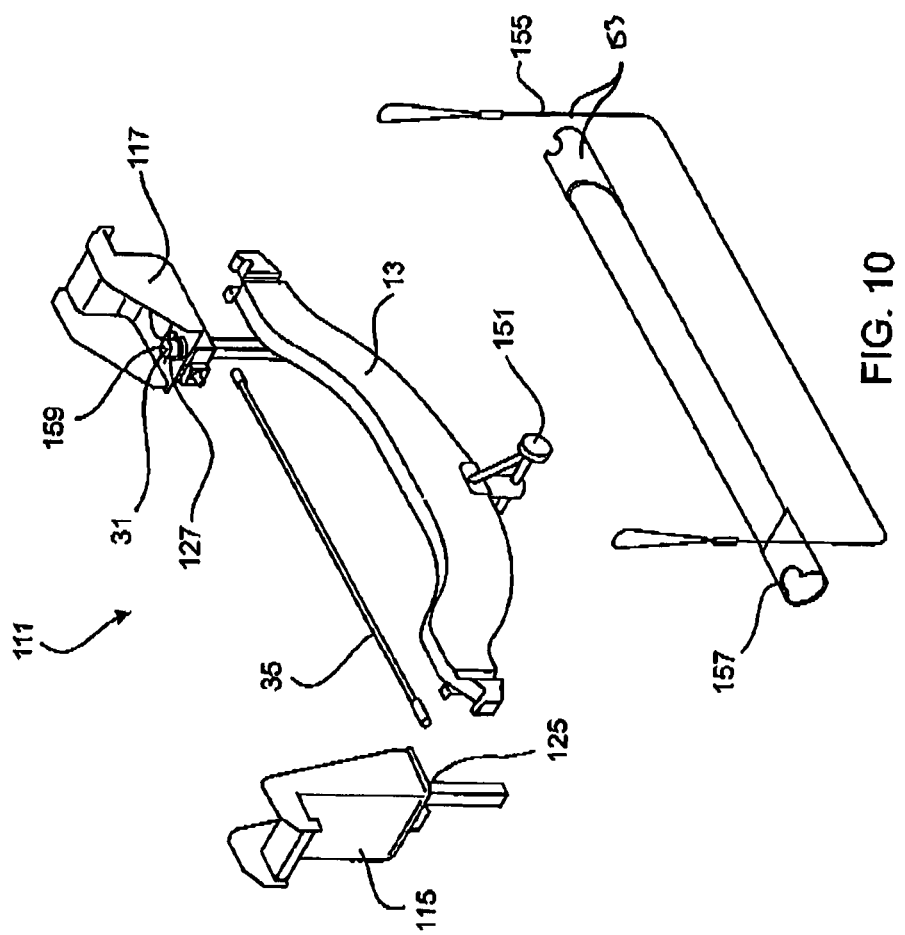

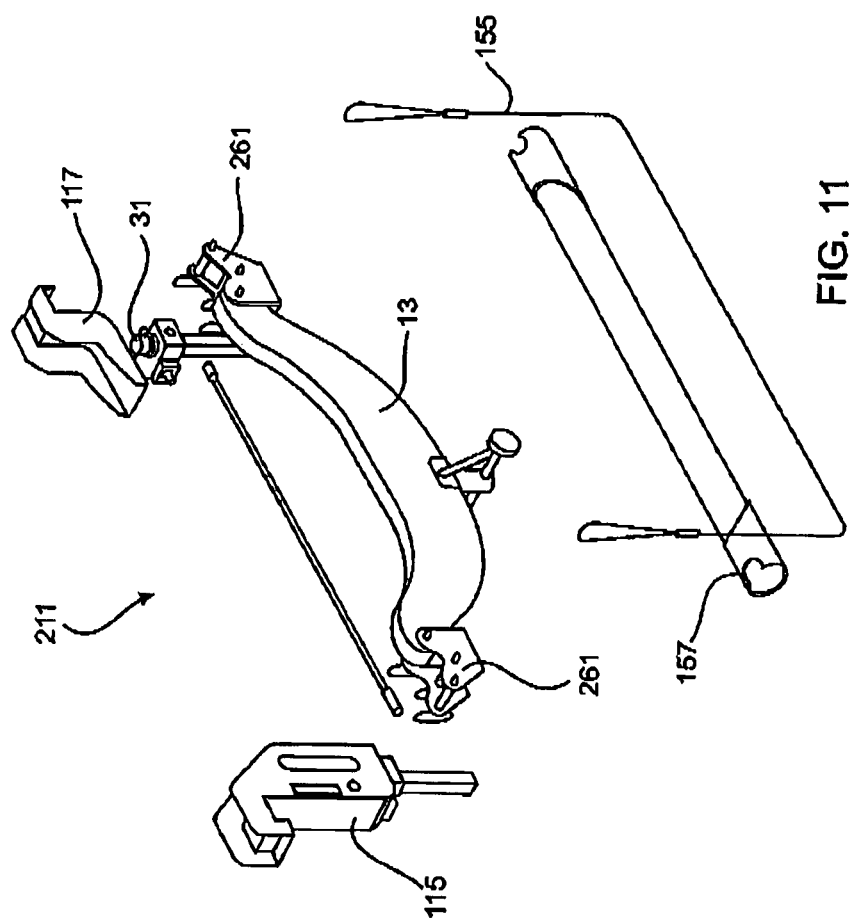

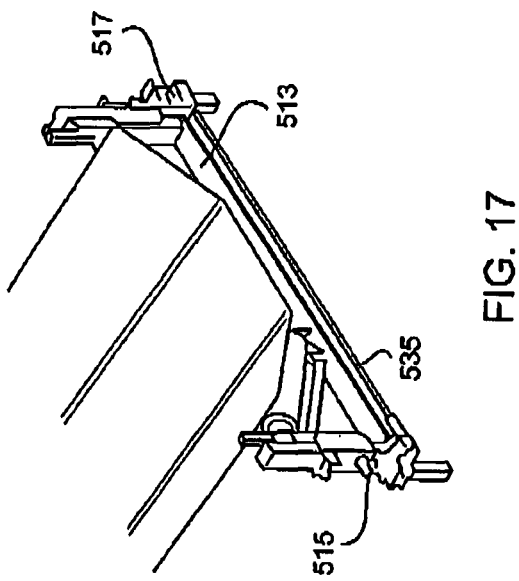
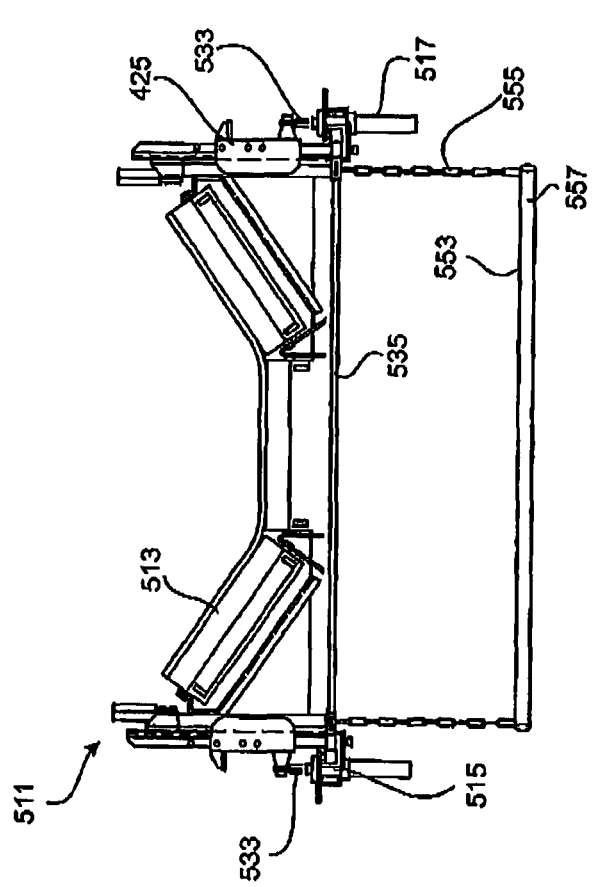
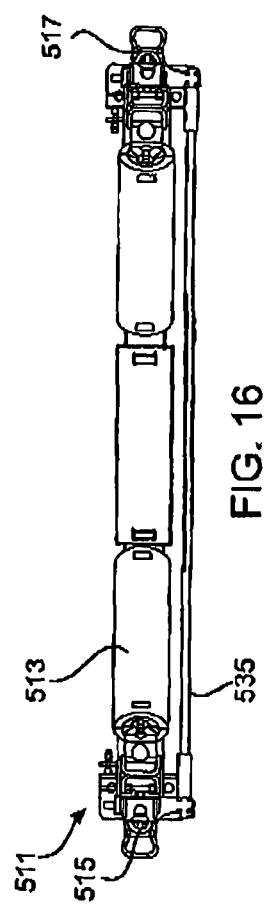

SUPPORT ASSEMBLY

CROSS-REFERENCE TO RELATED APPLICATIONS

This application is a 371 U.S. National Stage of International Application No. PCT/AU2012/000003, filed Jan. 3, 2012, and claims priority to Australian Patent Application No. 2010905663, filed Dec. 24, 2010, and Australian Patent Application No. 2010905669, filed Dec. 24, 2010, the disclosures of which are herein incorporated by reference in their entirety.

TECHNICAL FIELD

The present invention relates to a support assembly to assist in accessing conveyor rollers.

BACKGROUND ART

The following discussion of the background art is intended to facilitate an understanding of the present invention only. The discussion is not an acknowledgement or admission that any of the material referred to is or was part of the common general knowledge as at the priority date of the application.

Conveyors are used in many industries to convey material from one location to another for various purposes. Most conveyors employ a conveyor belt that moves over rotatable rollers (or idlers). The rotatable rollers are supported beneath the conveyor belt. The conveyor belt moves over the rotatable rollers, with the underside of the conveyor belt contacting the rollers. The upper side of the Conveyor belt carries the material being conveyed.

By way of example, in the mining industry such conveyors may be used to carry ore or other material around a site, from site to site, as well as to loading bays and on to ships, trains, trucks and/or other suitable transportation.

The rollers are held in supports mounted beneath the conveyor belt. These rollers, in turn, support the load of the material conveyed on the conveyor belt. For example, the belts in iron ore mining industries carry very large loads, up to 10,000 tonnes per hour; therefore these rollers are under constant heavy load.

Conveyors also have return rollers which support the conveyor belt on its return journey.

Over time rollers fail for multiple different reasons. In some instances the bearings seize, the roller disintegrates, or can even explodes due to the pressure and heat generated by the roller. Whilst rollers are systematically checked and changed out, roller failure is difficult to predict. As such, rollers can fail whilst in service. These failures can cause hundreds of thousands of dollars worth of damage, as well as loss of production due to the downtime required to effect repairs and/or replacement of broken rollers.

The mining companies typically have full time maintenance crews to maintain the integrity of the conveyors, with some crews repairing the belts and cleaning the scrapers on the belts whilst other crews constantly change out damaged rollers.

Currently, the roller frames which support the rollers are largely formed from a series of channels, referred to in the industry as "RSJ", and are of rigid construction. They are built to carry three or four rollers of differing length and diameter depending on the conveyor belt size and the amount of material required to be carried on the conveyor belt. The roller frames are attached to stringers which run the full length of the conveyor, and are themselves supported on support frames.

If a roller is damaged during operation of the conveyor it needs to be replaced before it damages the belt. To change a damaged roller a four man crew is typically used. Before the change out can occur the conveyor belt must be cleared of all ore or any other material being carried on the conveyor belt. The time taken to do this depends on the length of the conveyor but can be between 20-90 minutes. Once cleared the crew then use a car jack attached to a makeshift extendable pipe. This is supported on the stringer to push the conveyor belt away from the rollers. Once the belt is pushed away the roller requiring change out is accessible. With this technique the belt can only be pushed away from the roller a sufficient distant to access only one roller. As a result the process needs to be repeated for each roller, and will need to be executed on the other side of the conveyor belt for rollers on that side.

Once the damaged roller has been changed, the conveyor the belt is recharged with ore. This could take a similar period of time to get the ore flowing as it was to clear the belt. Typically the time it takes to actually replace the damaged roller is one hour. Whilst roller change out is scheduled accordingly to maintenance schedules, there are still three to five roller change outs required per week which are unscheduled. This represents a significant down time, even more so if the belt has not been damaged by the failed roller.

Due to the environment in which many conveyors operate, the rollers tend to be quite large and tend to jam in the roller frames. To remove these from the roller frame the maintenance crew typically use a sledgehammer and/or jimmy bars to remove the roller. If the belt has not been or cannot be moved sufficiently clear of the roller then removal of the roller becomes more difficult.

Typically the maintenance crew are required to sit between the return belt and the raised belt in order to access and be able to lift the roller to be changed.

To change the return rollers, a first spread bar is placed on top of the return travel section of the conveyor belt and another spreader bar is placed under the bottom of the return travel section of the conveyor belt. These spreader bars are then linked to each other with a chain block or "come-a-long" at either side of the conveyor belt. Then, the return travel section of the conveyor belt is lifted to take the weight of the conveyor belt off the return roller. In some sections, the conveyor belts have inverted V rollers instead of normal longer type return rollers. These inverted V rollers are exposed to a large amount of pressure and weight as they near the conveyor belt heads and the counter weights.

Another difficulty with roller change out is the roller location. In some instances operators are required to get underneath the conveyor or be lifted to a conveyor in order to change a roller.

With the current practice, only one roller can be safely changed out at a time. Several jacks cannot be placed along the stringer and the belt lifted simultaneously by each jack. Due to the increase in tension the belt would experience, the jacks would experience significant compression which would result in failure of the jacks.

It is extremely difficult and very unsafe to change rollers under the current practice. Not only does the conveyor experience significant downtime, but the labour intensive process requires a large team. The practice is also quite dangerous in light of the loads and type of machinery which is being repaired.

It is difficult to find a solution to roller change out which can be applied to a large range of conveyor configurations. Conveyors vary significantly from site to site. Widths of conveyor belts on mining sites range in size from 600 mm to 2.4 meters and the roller frames are manufactured accordingly to fit differing stringers and conveyor belts. At any one mine site, there can be up to six different sizes of roller frames held in stock. If a roller frame is damaged, even only slightly, the whole frame needs to be replaced and the replacement procedure is a cumbersome operation on its own.

The procedure that the maintenance crews use to change rollers is very cumbersome, labour intensive, hazardous and can lead to accidents. This creates an overhead that operators of conveyors must bear. It would be desirable to eliminate, or at least reduce, the exposure to hazards associated with the roller change-outs and also to reduce the costs associated with plant downtime when rollers require replacement, maintenance or repair.

Other solutions have been developed but these have not provided practical solutions. Most of these solutions are at least partly automated whereby a support frame is placed between existing roller frames on a conveyor system. The support frame is then caused to move upward to engage the conveyor belt and then to raise the belt above the roller frames. In order to raise the support frame, screw jacks or hydraulic rams are used. However, as the operation of the screw jacks/hydraulic rams is performed by an operator on either side of the conveyor the ends of the support frame are raised at different speeds. In light of the weight of the belt as well as the support frame, the support frame tends to readily jam as the sides of the support frame are raised at different levels. When this occurs the operators are required to lower the support frame and start again. Another disadvantage of these systems is their weight. The prior art support frames claim to be portable, however, in reality the support frames are heavy and not easily handled by the operators.

Another solution is the use of scissor type lifts. These lifts are particularly cumbersome, are heavy and due to the large number of parts require significant maintenance, particularly when used in the harsh mining environment. Furthermore, these types of lifts are prone to unwinding or otherwise collapsing when in use.

SUMMARY OF INVENTION

It is an object of this invention to provide a support assembly which may used to allow removal of rollers from a conveyor in a safer manner.

The present invention provides a support assembly for lifting a belt of a conveyor system, the support assembly comprising:
an attachment assembly to releasably secure a support member to a frame of a conveyor system;
the attachment assembly comprising a lifting means to move the support member, in a synchronised manner between a first position, wherein the support member is not in engagement with the belt, and a second position, wherein the support member supports the conveyor belt at a spaced distance from at least one conveyor roller located below the belt, allowing an operator to access the at least one roller.

Preferably when moving the support member between the first position and the second position the support member is maintained at substantially the same angular orientation. In most instances the longitudinal axis of the support member will remain substantially horizontal when moving between the first position and the second position.

In contrast to the prior art the support member is raised in a synchronised manner such that the support member does not jam as it engages and moves the belt away from the rollers.

Preferably when the support member is in the second position, a plurality of rollers is accessible for change out. This further cuts down the downtime required for roller change out when compared to the prior art Preferably the attachment assembly secures the support member relative to the stringers of the conveyor frame.

The attachment assembly may comprise an attachment means to lock the support member in place relative to the conveyor frame.

The attachment means may be in the form of a quick release clamp whereby the clamp is operated by a lever.

Preferably there are two attachment assemblies, a first attachment assembly to attach a first end of the support member to a first stringer, and a second attachment assembly to attach a second end of the support member to a second stringer.

Preferably a first lifting means of the first attachment assembly is associated with the first end of the support member, and a second lifting means of the second attachment assembly is associated with the second end of the support member.

Each attachment assembly may be in the form of a support housing and a slidable member slidably supported in the support housing. The support housing may be adapted to be attached and locked to the stringer by the attachment assembly. Each slidable member may be slidably supported in its support housing whereby an end of the slidable member may be attached to the support member.

Preferably when each slidable member is received in its respective support housing the support member is in the first position, and when the slidable member extends therefrom a predetermined length the support assembly is in the second position. The first and second positions corresponding to the first and second positions of the support member.

The attachment assembly may comprise a locking means to lock the support member in place when in the second position. The locking means may be in the form of a sleeve having an open side whereby the sleeve is adapted to fit over the slidable member when in its second position preventing the slidable member returning to its first position. Alternatively, the locking means may be in the form of a pin which is adapted to be received in at least one aperture when the slidable member is in its second position. The slidable member will not be able to return to its first position until the pin is removed.

Each lifting means may be activated by an activation means. Upon activation of the activation means each lifting means reacts simultaneously to cause each slidable member to move relative to its support member. Preferably upon activation the slidable member of each lifting means moves at the same time as the other slidable member.

In one aspect of the invention each lifting means comprises a hydraulic ram. The hydraulic ram comprises a hollow portion in which a piston moves, the hydraulic ram having a first portion on one side of the piston and a second portion on the other side of the piston. In another aspect of the invention each lifting means comprises a screw jack. Each screw jack may be connected by a rod, whereby rotation of the rod moves both screw jacks.

Preferably the support assembly comprises a return lifter member adapted to be removably secured to each attachment assembly. The return lifter member may be in the form of a chain/sling. The chain/sling may support a spreader bar which is adapted to engage the return belt. In use the spreader bar of the return lifter member may be positioned below the belt as it returns under the loaded belt. Preferably upon activation of each lifting means, the return lifter member engages the return belt to raise the belt off the return rollers, allowing an operator to access the return rollers.

In one aspect of the invention the activation means is in the form of a hydraulic system. In one embodiment of the hydraulic system each slidable member is provided by the hydraulic ram. In another embodiment each slidable member incorporates the hydraulic ram.

Preferable the hydraulic ram of the slidable member of the first attachment assembly comprises a double acting ram whereby fluid transfers into a first portion of the hydraulic ram causes the piston to move, whereby movement of the piston causes the hydraulic fluid in a second portion of the hydraulic ram to exit the second portion. The opposite movement occurs when fluid exits the first portion of the hydraulic ram.

Preferable the hydraulic ram of the second slidable member is in fluid communication with the second portion of the hydraulic ram of the first slidable member, whereby fluid leaving the second portion of the hydraulic ram of the first slidable member causes the piston in the hydraulic ram of the second slidable member to move. The hydraulic ram of the first slidable member and the hydraulic ram of the second slidable member may be in fluid communication via a hose extending there between. The hose may pass through a tube located on the support member. Alternatively the hose may pass through a cavity contained within the support member. In both instances the hose is protected.

Preferably the first portion of the hydraulic ram of the first slidable member is in fluid communication with a hydraulic pump. Preferably upon operation of the hydraulic pump, hydraulic fluid enters the hydraulic ram of the first portion of the first slidable member, this results in movement of the piston, causing hydraulic fluid to exit the upper portion of the hydraulic ram and enter the first portion of the hydraulic ram of the second slidable member.

Preferably the hydraulic rams of the first slidable member and the second slidable member are sized such that upon activation of the hydraulic pump, and subsequent transfer of hydraulic fluid, the ends of the support member move simultaneously. Preferably the hydraulic ram of the first slidable member is larger than the hydraulic ram of the second slidable member. The synchronisation of the ends of the support member ensures the support member is raised in a manner which significantly reduces the likelihood of the support assembly jamming.

Preferably the support member is lowered by the hydraulic pump causing fluid to exit the first portion of the first slidable member. This causes the piston to move, resulting in fluid transferring from the first portion of the second slidable member to the second portion of the first slidable member, causing the piston in the second slidable member to move simultaneously with the piston of the first slidable member.

In another aspect of the invention the activation means is in the form of a hydraulic system. In one embodiment each slidable member is provided by the hydraulic ram. In another embodiment each slidable member incorporates the hydraulic ram, whereby the hydraulic ram may be removed from the slidable member for use in another slidable member.

The hydraulic system may comprise a hydraulic pump whereby the hydraulic pump is in fluid communication with each hydraulic ram. The hydraulic pump may incorporate a dual pump which delivers a metered volume of hydraulic fluid to each hydraulic ram. This ensures each hydraulic ram moves in a synchronised manner to ensure the ends of the support member are raised simultaneously.

In the reverse direction, the hydraulic pump may cause fluid to flow from the hydraulic rams in a synchronised manner. The hydraulic pump may comprise a speed control valve to control in flow of fluid.

The hydraulic pump may comprise a single motor which drives the dual pump. The hydraulic pump may be battery powered such that it is portable. Preferably the hydraulic pump also has means to manually operate in the event the battery power fails.

In a further aspect of the invention the activation means is in the form of a screw jack assembly. In one embodiment each slidable member is provided by the screw jack. In another embodiment each slidable member incorporates the screw jack.

In use, rotation of the rod may cause each screw jack to move in a synchronised manner. This ensures the ends of the support member are raised simultaneously. Similarly, the rod may be rotated to lower each screw jack in a synchronised manner such that the ends of the support member are lowered simultaneously.

The activation means may rotate the rod. The activation means may be a drill.

The rod may be removable.

In one aspect of the invention the support assembly is portable. Preferably the support member assembly can be installed and operated by a single operator. The portable support assembly allows easy change out without the requirement of fitting a more permanent solution.

When assembled, the support housing may be rotatable with respect to the support member such that the longitudinal length of the support housing may substantially align with the longitudinal length of the support member. In this orientation the support assembly is relatively flat. This will allow easy installation of the support assembly as well as easy storage and transportation.

Preferably the support member is of single piece construction and is in the form of a support beam. Preferably the support beam is curved to complement the lateral profile of the belt when sitting on the rollers. Preferably the support member is made from a light and strong material such as carbon fibre. This assists in the portability of the support member.

Preferably the attachment assembly releasably secures the support member relative to the stringers of the conveyor frame.

Preferably each attachment assembly may be attached to respective sides of the support member at multiple locations. Alternatively, an adapter may be located between each attachment assembly and the respective sides of the support member to extend the effective length of the support assembly. This allows the support assembly to be used to raise belts of various widths.

In one aspect of the invention the attachment assembly supports the support member, when in the first position, above the horizontal plane of the stringers.

In another aspect of the invention the attachment assembly supports the support member when in the first position substantially in the same or below the horizontal plane of the stringers. This is particularly useful where the belt runs close to the stringers, as is the case in conveyors running through tunnels.

Preferably the support member has a wheel located on a bottom edge. The wheel can rest on the return belt to assist in guiding and positioning the support member when one side of the roller is not accessible. Again, this is particularly suited where conveyors run through a tunnel. Preferably the wheel is located off centre relative to the support beam. This will allow for easier positioning of the attachment assembly located on the side of the tunnel which is inaccessible as the operator can raise or lower the other side more easily.

In another aspect of the invention the support assembly is fixed to the conveyor frame so as to remain in place at all times. The support assembly may replace a conventional roller frame, or may be installed adjacent existing conventional roller frames. The conveyor may comprise multiple support assemblies spaced at regular intervals along the conveyor. This will allow easy and fast access to any roller within the conveyor.

Preferably the support assembly may lift a full belt. Preferably the support assembly may lift a full belt as it is running. This saves significant downtime as the belt does not need to be emptied before the roller change out, and does not need to be recharged once the change out is complete.

The support member may be in the form of roller frame comprising a similar array and configuration of rollers as the conventional roller frames of the conveyor to which the support assembly is fitted.

Preferably the first position of the support member may be below the normal position of the belt. This will allow the rollers of the support member to be readily changed. The support member may be positioned between the first position and second position whereby the support member is in engagement with the belt. In this position the support assembly adds support to the conveyor belt in a similar manner to a conventional roller frame.

The locking means may lock the slidable member when in the second position, allowing the hydraulic ram to be removed. This will enable the hydraulic ram to be used on multiple support assemblies.

Preferably the support assembly also comprises a tracking roller located at either end of the support member. The longitudinal axis of each tracking roller may be parallel to the longitudinal axis of the support housing. As belts travel along the conveyor they tend to drift away from the central position. This is often caused by an uneven load on the belt and is therefore unpredictable. To protect equipment and to prevent undesirable drift, most conveyors incorporate a plurality of stops spaced along the conveyor. The stops are supported on brackets and are positioned so that should the belt laterally drift beyond a desired amount they will engage the stops, preventing any further lateral drift. The provision of these stops adds to the expense and required maintenance of the conveyor. Furthermore, as the spacing is often too great, unwanted vibrations are created in the conveyor system. By having tracking rollers on the support assembly, they can be more accurately positioned and do not require separate infrastructure to support them. They can also be spaced closer to improve belt tracking and therefore extend the life of the rollers.

The support assembly may be operated by two operators.

The present invention further provides a support member assembly for lifting a belt of a conveyor system, the support member assembly comprising:

an attachment assembly to releasably secure a support member to a frame of a conveyor system;

a first lifting device to move a first end of the support member, and a second lifting device to move a second end of the support member, whereby the first lifting device and second lifting device operate in a synchronised manner to move the respective ends of the support member simultaneously;

the lifting means being attached to the attachment assembly, the lifting means being adapted to move the support member in a synchronised manner between a first position and a second position;

wherein in the second position the conveyor belt is spaced from at least one conveyor roller located underneath the belt, allowing an operator to access the at least one roller.

Preferably the respective ends of the support member are moved at the same speed.

The present invention further provides a support member assembly for lifting a belt of a conveyor system, the support member assembly comprising:

an attachment assembly to releasably secure a support member to a frame of a conveyor system;

a lifting means to move the support member, the lifting means being attached to the attachment assembly, the lifting means being adapted to move the support member between a first position and a second position, whereby the support member retains the same angular orientation as it moves between the first position and the second position;

wherein in the second position the conveyor belt is spaced from at least one conveyor roller located underneath the belt, allowing an operator to access the at least one roller.

In accordance with one aspect of the present invention, there is provided a support frame assembly for lifting conveyor belts of a conveyor system, the assembly comprising a first support means and a second support means, in use, arranged to be located on respective sides of a conveyor belt, each support means comprises a support housing and a slidable member that is slidable relative to said support housing;

the slidable member being adapted to be attached to a roller support frame; and fixing means for fixing said slidable member in an elevated position along said support housing wherein the roller support frame is in an elevated position so as to support the conveyor belt in an elevated position;

wherein the respective support means are associated with a lifting means to lift each support means simultaneously and at substantially the same speed.

The present invention further provides a conveyor comprising one or more support assemblies as herein before described.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 4 is a front view of the support assembly of FIG. 1 showing two different types of lifting means;

FIG. 5 is a perspective view of FIG. 4;

FIG. 10 is an exploded perspective view of a support assembly according to a third embodiment of the invention;

FIG. 11 is an exploded perspective view of a support assembly according to a fourth embodiment of the invention;

FIG. 15 is a front view of the support assembly similar to FIG. 13 with a different lifting means and with a return belt lifting member;

FIG. 16 is a plan view of FIG. 15;

FIG. 17 is a perspective view of FIG. 15;

In the drawings like structures are referred to by like numerals throughout the several views. The drawings shown are not necessarily to scale, with emphasis instead generally being placed upon illustrating the principles of the present invention.

DESCRIPTION OF EMBODIMENTS

The present invention is in the form of a support assembly which has been designed to move a belt of a conveyor system a sufficient distance away from the conveyor rollers to allow an operator to access the roller(s) such that the roller(s) may be replaced or repaired. The support assembly is adapted to move between a first position and a second position wherein the belt is spaced form the roller(s).

The figures depict various embodiments of the support assembly. The embodiments illustrate certain configurations, however, it is to be appreciated that the invention can take the form of many configurations, as would be obvious to a person skilled in the art, whilst still embodying the present invention. These configurations are to be considered within the scope of this invention.

Referring to the figures, FIGS. 1 to 8 illustrate various embodiments of a portable support assembly. FIGS. 9 to 14 illustrate various embodiments of a support assembly designed to remain permanently in place.

Referring to FIGS. 1 to 5, the invention according to the first embodiment is in the form of a support assembly 11. The support assembly 11 of this embodiment is adapted to be portable and is suited to be fitted to those conveyors in which the belt is located above the stringers of the conveyor.

Figure 1:
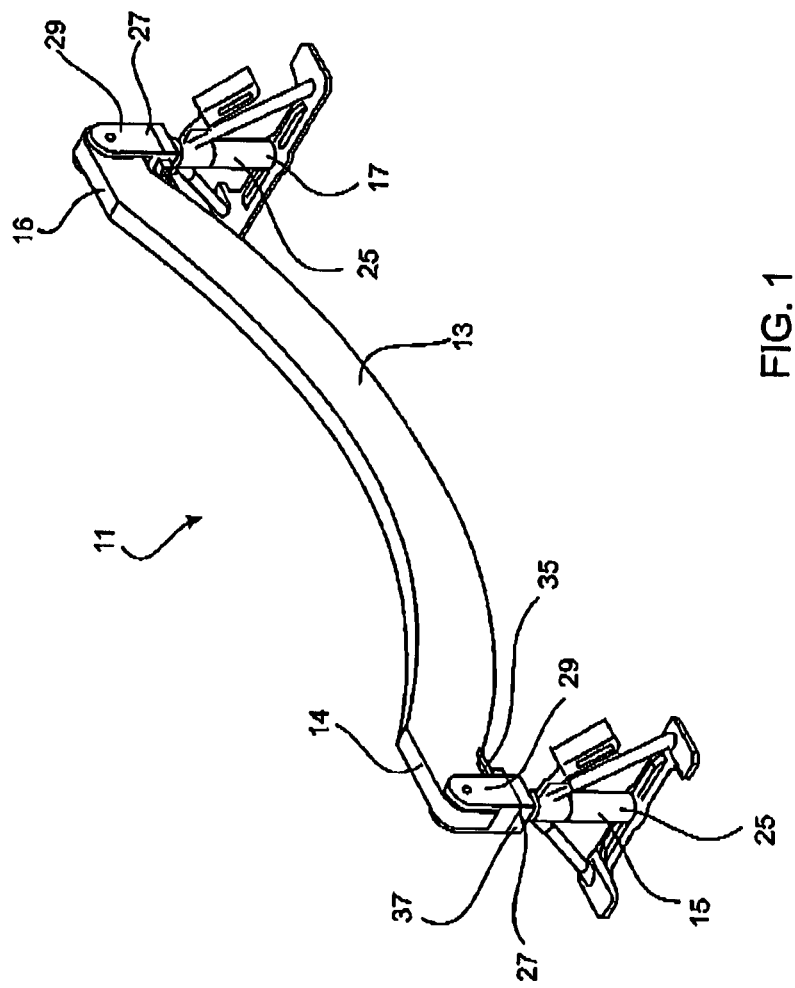
FIG. 1 is a perspective view of a support assembly in a first position, according to a first embodiment of the invention, an attachment means not shown.

The support assembly 11 comprises a support member in the form of a support beam 13 having a first end 14 and second end 16. During operation the support beam 13 moves from a first position, as shown in FIG. 1, to engage an under side of the belt (not shown) before moving and supporting the belt to a second position. To assist in maintaining the profile of the belt the support beams 13 has a curved profile.

Figure 3:
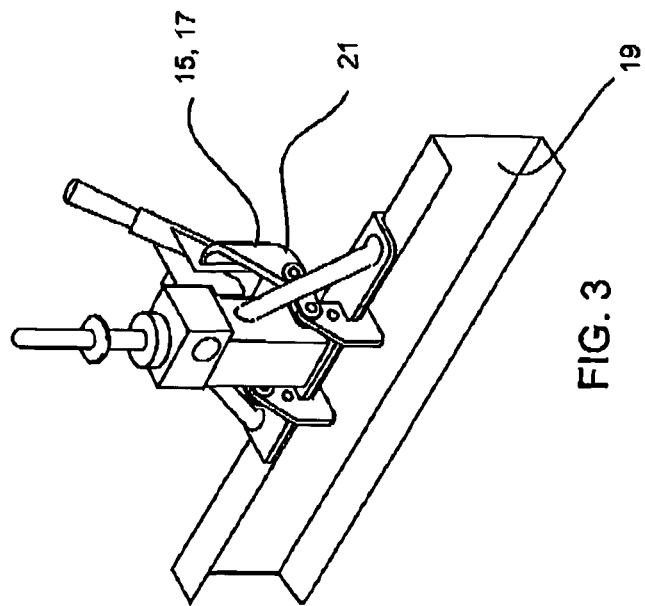
FIG. 3 is a perspective view of FIG. 2.
Figure 2:
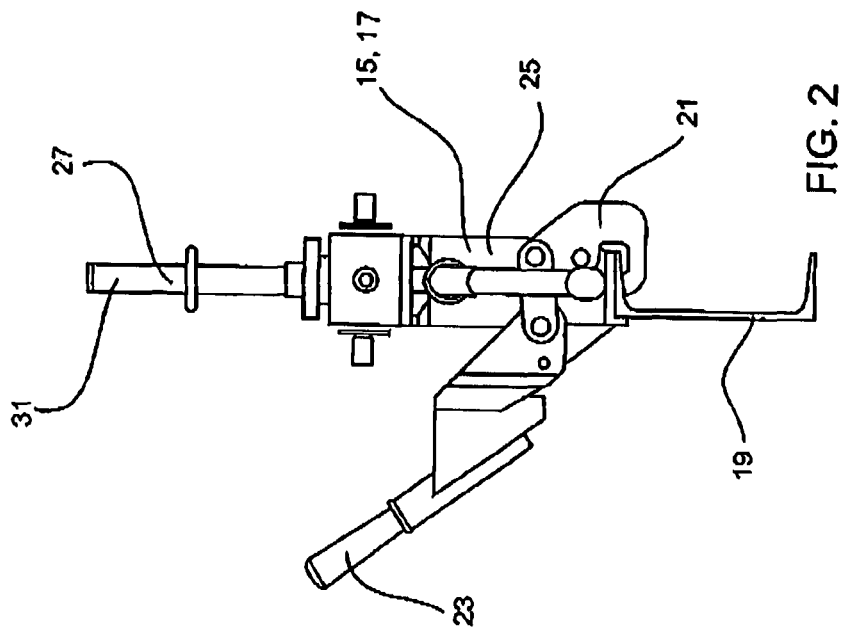
FIG. 2 is a side view of an attachment assembly according to the first embodiment.

The support assembly 11 also comprises a first attachment assembly 15 and a second attachment assembly 17 located at respective ends of the support beam 13. Referring to FIGS. 2 and 3 each attachment assembly 15, 17 is adapted to releasably secure the support beam 13 to the conveyor frame by clamping the support assembly 11 to the respective stringers 19 which form part of the conveyor frame. Each attachment assembly 15, 17 comprise an attachment means in the form of a quick release clamp 21 which is operated by a handle 23. This enables an operator to easily position the support assembly on the stringers before quickly clamping the support assembly 11 in place.

Each attachment assembly 15, 17 also comprises a support housing 25 and a slidable member 27 slidably supported in the support housing 25. In use, each support housing 25 is releasably secured to respective stringers 19 whilst an end 29 of each slidable member 27 is secured to respective ends 14, 16 of the support beam 13.

Each support hosing 25 is rotatable with respect to the support beam 13 such that the longitudinal axis of the support housing 25 lies in substantially the same plane as the longitudinal axis of the support beam 13. This allows the support assembly 11 to be relatively flat, enabling the support assembly to be manoeuvred and positioned where there is limited clearance between the belt and the stringers. It also allows for easy storage and transportation.

Each attachment assembly 15, 17 also comprise a lifting means, which, in FIGS. 1 to 3, is in the form of a hydraulic ram 31. FIGS. 4 and 5 show two variations of the lifting means, one in which the lifting means is in the form of hydraulic rams 31, the other in which the lifting means is in the form of a screw jack 33. The two types of lifting means are shown side by side in FIGS. 4 and 5 and are for illustration purposes only. In use, the support assembly 11 would be fitted with one or the other lifting means.

Referring to FIGS. 1 to 3 the slidable member 27 is in the form of the hydraulic ram 31 wherein the exposed end is attached to the support beam 13. The hydraulic rams 31 are in fluid communication with each other via hose 35. Hose 35 extends through the support beam 13 such that the hose is protected from damage.

The lifting means moves the support beam 13 between the first position and the second position. The lifting means are activated by an activation means, not shown. The activation means of the embodiment in FIGS. 1 to 3 is in the form of a hydraulic system comprising a hydraulic pump, not shown. In use, the hydraulic pump is fluidly connected to the hydraulic ram 31a of the first attachment assembly 15 through nozzle 37.

In operation, the fluid pump pumps fluid into a first portion of the hydraulic ram 31a. This causes the piston of the hydraulic ram 31a to move upwardly. As this occurs fluid simultaneously leaves a second portion of the hydraulic ram 31a and passes through hose 35 into the hydraulic ram 31b of the second attachment assembly 17, causing the piston of that hydraulic ram 31b to move in a simultaneous manner. The hydraulic rams 31a and 31b differ in size to ensure synchronised movement of the hydraulic rams. As a result the support beam 13 moves from the first position to the second position in a manner whereby the angular orientation of the support beam 13 is maintained.

In order to return the support beam 13 to the first position, the hydraulic pump sucks fluid out of the hydraulic cylinder 31a, which has the effect of reversing the fluid transfer discussed above. The hydraulic cylinders 31a,b therefore returns the support beam 13 in a controlled manner such that the movement of the beam ensures a constant angular orientation.

The support assembly 11 also comprises a locking means 65 to lock the support member 27 in place when in the second position. The locking means may be in the form of a sleeve 66 having an open side whereby the sleeve can receive and fit over the slidable member 27 when in its second position to prevent the slidable member returning to its first position.

The alternative lifting means shown in FIGS. 4 and 5 is in the form of a screw jack assembly. The screw jack assembly comprises two screw jacks 33 interconnected by a rod 135. In use, rotation of the rod 135 causes each screw jack 33 to move in a synchronised manner. This ensures the ends of the support beam 13 are raised simultaneously. Similarly, the rod 135 is rotated to lower each screw jack 33 in a synchronised manner such that the ends of the support member are lowered simultaneously.

A second embodiment a support assembly 611 of the invention is illustrated in FIGS. 6 to 9. For convenience features of the support assembly 611 that are similar or correspond to features of the support assembly 11 of the first embodiment have been referenced with the same reference numerals.

Figure 6:
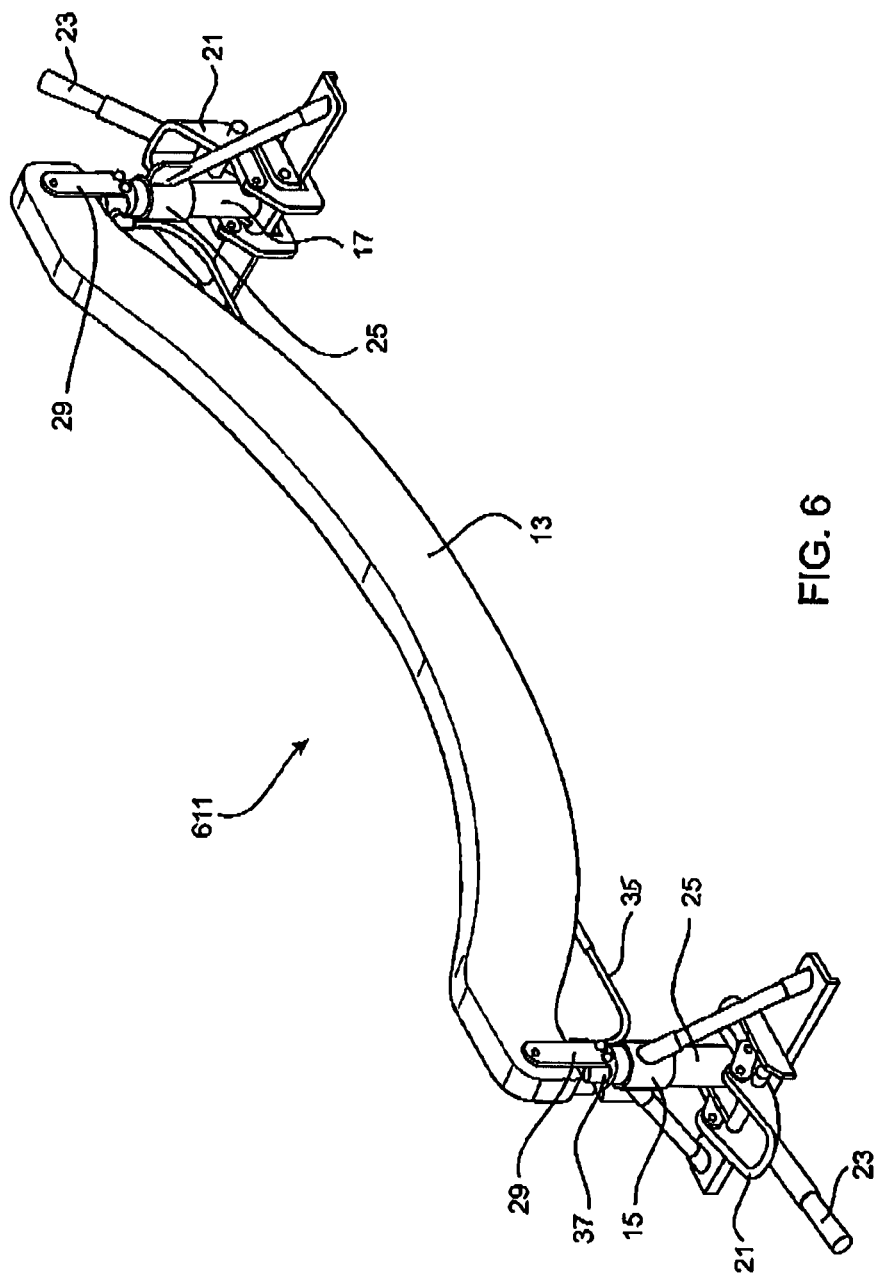
FIG. 6 is a perspective view of a support assembly in a first position, according to a second embodiment of the invention, a locking means not shown.

This embodiment is very similar to that of the first embodiment and largely has the same components, and operates in the same manner. Referring to FIG. 6 the attachment assembly 15 shows the quick release clamp 21 in an open position, whilst the second attachment assembly 17 shows the quick release clamp in a closed or clamped position.

Figure 9:
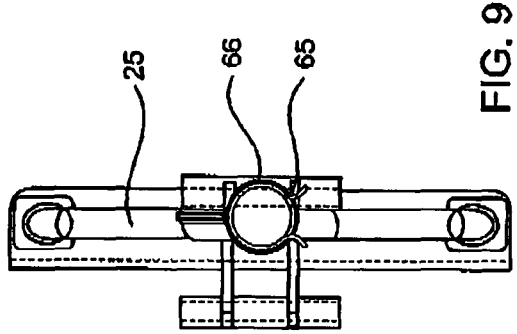
FIG. 9 is a plan view of FIG. 7.
Figure 8:
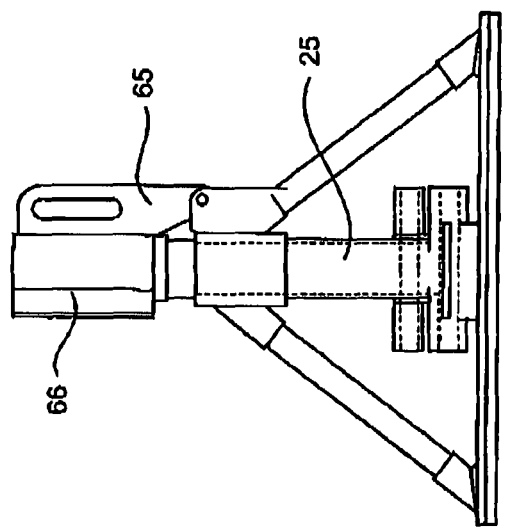
FIG. 8 is a side view of FIG. 7.
Figure 7:
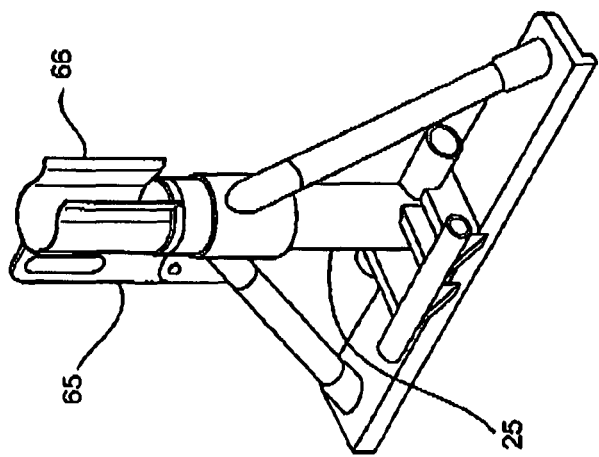
FIG. 7 is a perspective view of a support housing and a locking means for use with the support assembly of the second embodiment.

FIGS. 7 to 9 show the support housing 25 of each attachment assembly 15, 17 with the locking means 65 shown in the position it would be moved to, to lock the slidable support in the second position. In these figures the slidable member is not shown.

A third embodiment of the invention is illustrated in FIG. 10. For convenience features of the support assembly 111 that are similar or correspond to features of the support assembly 11 of the first embodiment have been referenced with the same reference numerals.

The support assembly 111 is similar that of the first embodiment in that it is designed to be portable. The main difference between the first and third embodiments is that the support assembly 111 of the third embodiment is adapted to be used in those areas in which the belt runs either adjacent to or below the stringers 19. This is particularly the case where a conveyor runs through a tunnel or other enclosed area. As there is minimal room, the conveyor is design such that the roller frame of the conveyor hangs down from the stringers. This enables the conveyor belt to travel close to the stringers. However, this then increases the difficulty in maintaining the rollers. Also, as is typical in conveyors operating through a tunnel, the conveyor only has a walkway or access point from one side of the conveyor. As a result the support assembly 111 must be able to manoeuvred into position from one side.

Support assembly 111 is adapted to be releasably secured to the stringers 19 such that the support beam 13 can be positioned between or below the stringers. The support assembly 111 comprises a first attachment assembly 115 and a second attachment assembly 117 which are adapted to hook onto opposed stringers 19. Each attachment assembly 115, 117 comprises a clamp, not shown, which may be operated by a handle, not shown, to clamp each attachment assembly into place. The handle allows the second attachment assembly 117, which is on the far side of the walkway and therefore not easily accessible, to be clamped by an operator on the walkway.

Each attachment assembly 115, 117 comprise a support housing 125, a slidable member 127 slidably supported by the support housing 125, and a lifting means in the form of a hydraulic ram 31. In the present embodiment the slidable member 127 is provided by the hydraulic ram 31. The exposed end 159 of each hydraulic ram 31 is secured to respective ends 14, 16 of the support beam 13. In this embodiment the hose 135 extends between the two hydraulic rams 31 such that they are in fluid communication. The hose 135 is external the support beam 13.

The support assembly 111 also comprises a multi directional wheel 151 secured to the bottom of the support beam 113. During installation of the support assembly 111 in to a position ready to lift the belt, the wheel 151 can be placed on to the return belt to support the weight of the support beam 13 as it placed into positioned. The wheel 151 is positioned so as to be closer to the first end 14 of the support beam. This will allow the operator to easily raise the second end 14 of the support beam 13 to hook the second attachment assembly 117 onto the stringer.

The support assembly 111 also comprises a return lifter member adapted to be removably secured to each attachment assembly 115, 117. The return lifter member 153 comprises a chain 155, which extends between the attachment assemblies and under the return section of the belt. To prevent the chain 155 damaging the belt the return lifter member 153 also comprises a spreader bar 157, through which the chain 155 passes. During operation the spreader bar 157 is placed below the return belt and engages the belt as the belt is caused to move away from the return rollers, allowing an operator to access the return rollers.

The operation of the support assembly 111 of this embodiment is similar to that of the first embodiment. Similar to the first embodiment, an activation means comprising a hydraulic pump, not shown, is used to pump fluid into the hydraulic ram 31a of the first attachment assembly 115. This has the immediate effect of transferring fluid from the hydraulic ram of the first attachment assembly 115 to the hydraulic ram 31b of the second attachment assembly 117. This ensures synchronised movement of the hydraulic rams 31a, 31b to ensure the support beam 13 is moved from a first position, whereby the support beam 113 has been installed, to a second position whereby the belt is raised a distance from the rollers.

During the same operation, the return lifter member 153 also moves to a position whereby the return belt has been lifted away from the return rollers.

A fourth embodiment of the invention is illustrated in FIG. 11. For convenience features of the support assembly 211 that are similar or correspond to features of the support assembly 111 of the third embodiment have been referenced with the same reference numerals.

As conveyors vary in width it is not desirable to have a support assembly for each different conveyor as each site may have many different conveyors. It is therefore preferable that the support assembly can be adapted to fit several conveyors of different width.

The support assembly 211 is similar that of the second embodiment. The main difference between the second and third embodiments is that the support assembly 211 of the third embodiment is adapted to be used between stringers 19 which are spaced further apart than the stringers the support assembly 111 of the third embodiment is designed to be used.

In the fourth embodiment the support assembly comprises adapters 261 which are secured to each end 14, 16 of the support beams 13. Each attachment assembly 115, 117 can then be attached to the adapters 261 before the support assembly 211 is placed in position for operation. Operation of the support assembly 211 is identical to that of the second embodiment.

Figure 12:
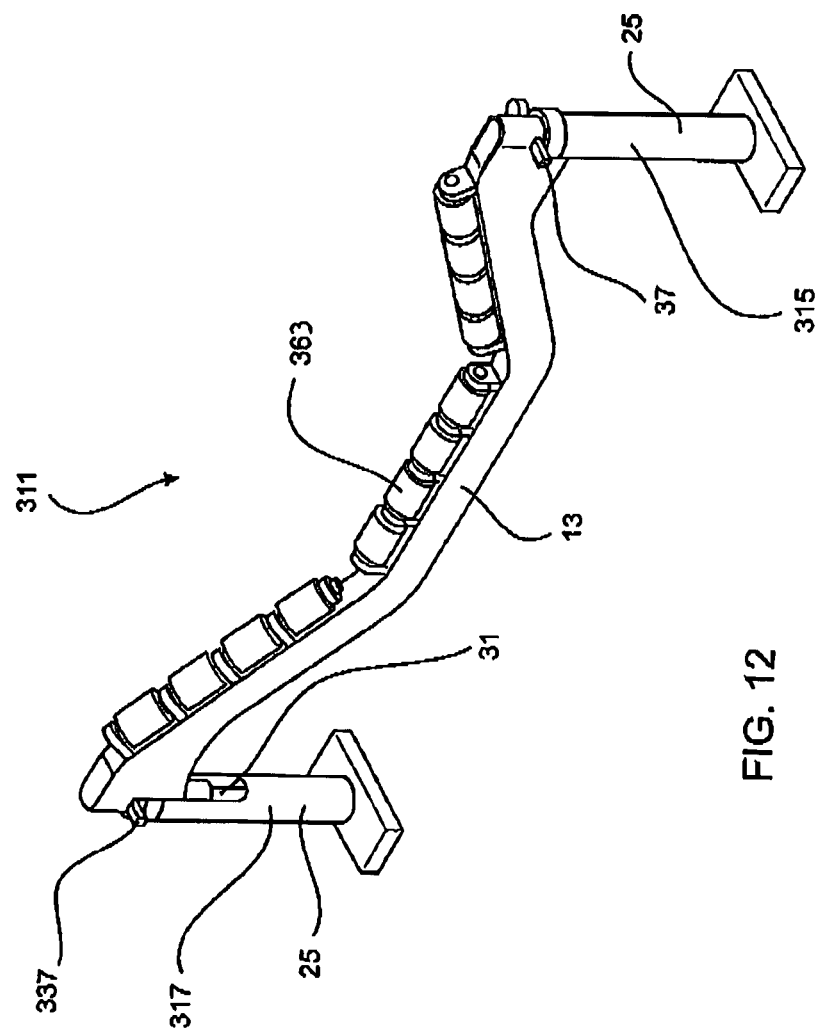
FIG. 12 is a perspective view of a support assembly in a first position, according to a fifth embodiment of the invention.

A fifth embodiment of the invention is illustrated in FIG. 12. For convenience, features of the support assembly 211 that are similar or correspond to features of the support assembly 11 of the first embodiment have been referenced with the same reference numerals.

This embodiment is similar to the support assembly 11 of the first embodiment, however, in this embodiment the support beam 13 supports a series of rollers 363, and the activation means varies to that of the first embodiment.

The activation means associated with this embodiment is also in the form of a hydraulic pump, not shown. In this embodiment the hydraulic pump comprises dual pumps having a hose extend from each pump to nozzles 337. Each attachment assembly 315, 317 of the support assembly 311 has a nozzle 337 associated therewith. Each nozzle 337 is in fluid communication with its respective hydraulic ram 31 located in the respective attachment assembly 315, 317.

The dual pump has one hose that places one hydraulic ram 31a in fluid communication with the hydraulic pump, whilst another hose places the other hydraulic ram 31b in fluid communication with the hydraulic pump. When activated the hydraulic pump delivers a metered volume of fluid through the dual pump to each hydraulic ram. The hydraulic pump controls the delivery of fluid so that each hydraulic ram 31 moves simultaneously, ensuring the support beam 13 is raised in a synchronised manner.

Figure 13:
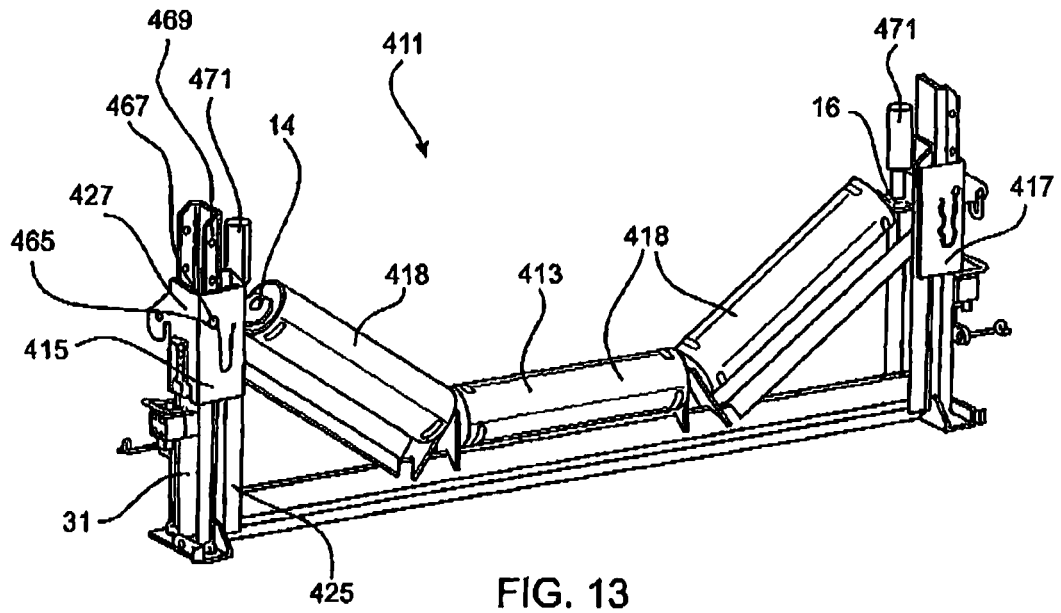
FIG. 13 is a perspective view of a support assembly according to a sixth embodiment of the invention wherein a support member of the support assembly is in a first position.
Figure 14:
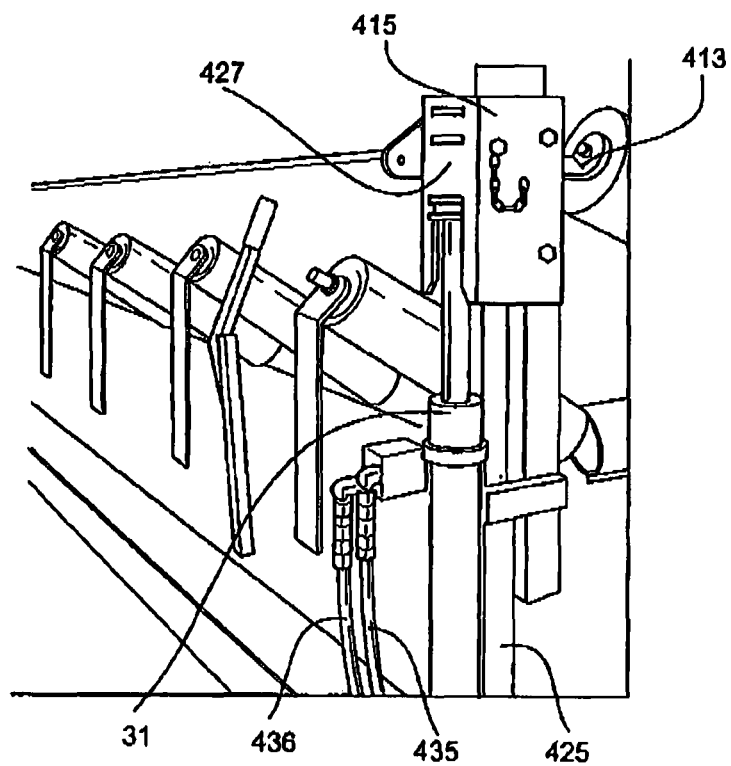
FIG. 14 is a perspective view of one end of the support assembly shown in FIG. 13 wherein the support member of the support assembly is in a second position.

Referring to FIGS. 13 and 14, the invention according to a sixth embodiment is in the form of a support assembly 411. For convenience features of the support assembly 411 that are similar or correspond to features of the support assembly 11 of the first embodiment have been referenced with the same reference numerals.

The support assembly 411 comprises a support member in the form of a support roller frame 413 having a first end 14 and second end 16. The support roller frame 413 supports three rollers 418 and is in the same configuration as the conventional roller frames of the conveyor the support assembly 411 will be secured. This assists in maintaining the profile of the belt when the belt is lifted, but also allows the support assembly 411 to replace a conventional roller frame.

Similarly to previous embodiments, during operation the support roller frame 413 moves from a first position, as shown in FIG. 13, to engage an under side of the belt (not shown), before moving and supporting the belt in a second position, as shown in FIG. 14.

The support assembly 411 also comprises a first attachment assembly 415 and a second attachment assembly 417 located at respective ends of the support roller frame 413. Each attachment assembly 415, 417 is adapted to secure the support roller frame 413 to respective stringers 19 of the conveyor frame. Each attachment assembly 415, 417 may be fastened directly to the stringers through bolt holes. These bolt holes may be pre-existing, as would be the case when the support assembly 411 replaces a conventional roller frame, or the bolt holes are formed in the stringers at the time the conveyor is manufactured.

Each attachment assembly 415, 417 also comprises a support housing 425 and a slidable member 427 slidably supported in the support housing 425. In use, each support housing 425 is secured to respective stringers 19 whilst an end 429 of each slidable member 427 is secured to respective ends 14, 16 of the support roller frame 413.

Each attachment assembly 415, 417 also comprise a lifting means, which, is in the form of a hydraulic ram 31, as best shown in FIG. 14. The slidable member 427 incorporates the hydraulic ram 31.

Each attachment assembly 415, 417 also comprise a locking means 465 to lock the attachment assembly in place when in the second position. In this embodiment the locking means 465 is in the form of a pin 467, which is passed through apertures 469 in both the slidable member 427 and support housing 425, which align when the attachment assembly is in the second position, whereby the belt is spaced away from the rollers.

When the locking means 465 is employed the hydraulic ram 31 can be removed from the attachment assembly. This allows the hydraulic ram to be used on other support assemblies to raise further sections of the belt.

In operation, upon activation of the activation means the support roller frame 413 is moved from the first position to the second position, whereby the belt is spaced from those rollers on the conventional roller frame. The activation means in this embodiment operates in the same manner as the activation means of the first embodiment. In this regard the hydraulic ram 31a of the first attachment assembly 415 is in fluid communication with the hydraulic ram 31b of the second attachment assembly 417 by hose 435, as shown in FIG. 14. The activation means is in the form of a hydraulic pump, not shown, which is in fluid communication with the hydraulic ram 31a of the first attachment assembly 415 by further hose 436. The operation of the support assembly 411 to move the support roller frame 413 from the first position to the second position is the same as that described in the first embodiment.

The support assembly 411 also comprises a tracking roller 471 on each side of the support roller frame 413. This assists in centralising the travel of the belt, and protects the support assembly 411 from belt drift.

When the support assembly 411 is not being used in the maintenance of rollers it may be placed in a third position whereby the support assembly 411 functions as a conventional roller frame.

The support assembly 411 of this embodiment is adapted to be permanently secured to a conveyor and is suited to be fitted to those conveyors in which the belt is located above the stringers of the conveyor. With this support assembly 411 it is also possible to lift the belt when the conveyor has a full load, in addition to the conveyor remaining in operation. Thus, the support assembly 411 not only makes it safer for an operator to attend to roller maintenance, but also minimises disruption of the conveyor.

A seventh embodiment of the invention is illustrated in FIGS. 15 to 17. For convenience features of the support assembly 511 that are similar or correspond to features of the support assembly 411 of the sixth embodiment have been referenced with the same reference numerals.

The support assembly 511 is similar to that of the fifth embodiment. A difference between the fifth and sixth embodiments is that the lifting means of each attachment means 515, 517 of the seventh embodiment is in the form of a screw jack 533. The two screw jacks 533 are interconnected by a rod 535. In use, rotation of the rod 535 causes each screw jack 533 to move in a synchronised manner. This ensures the ends of the support roller frame 513 are raised simultaneously.

The rod 535 can be rotated to lower each screw jack 533 in a synchronised manner such that the ends of the support roller frame 513 are lowered simultaneously.

A further difference between the sixth embodiment and the seventh embodiment is that the support assembly 511 of the six embodiment also comprises a return lifter member adapted to be removably secured to each attachment assembly 515, 517. The return lifter member 553 comprises a chain 555, which extends between the attachment assemblies and a spreader bar 557. When fitted, the spreader bar 557 passes under the return section of the belt. During operation the attachment assemblies 515, 517 move towards the second position. Upon movement of the attachment assemblies 515, 517 the spreader bar 557 engages the belt, moving the return belt away from the return rollers, allowing an operator to access the return rollers.

In the operation of the support assembly 511 of this embodiment, an activation means in the form of a drill, not shown, causes rod 535 to rotate, simultaneously causing the screw jacks 533 to raise the roller support frame in a synchronised manner. To lower the support roller frame 513 the rod is rotated in the reverse direction.

During the same operation, the return lifter member 553 also moves to a position whereby the return belt has been lifted away from the return rollers.

Figure 18:
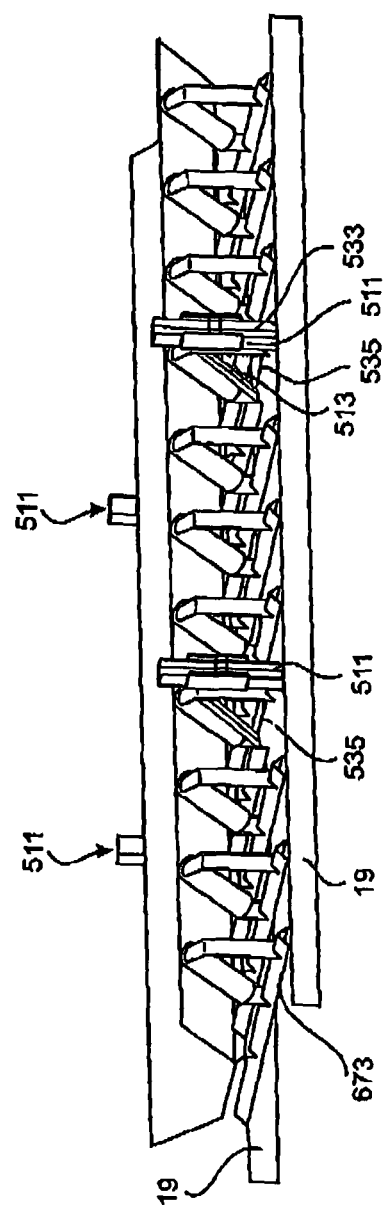
FIG. 18 is a perspective view of a section of a conveyor showing two support assemblies according to the fifth embodiment.
Figure 19:
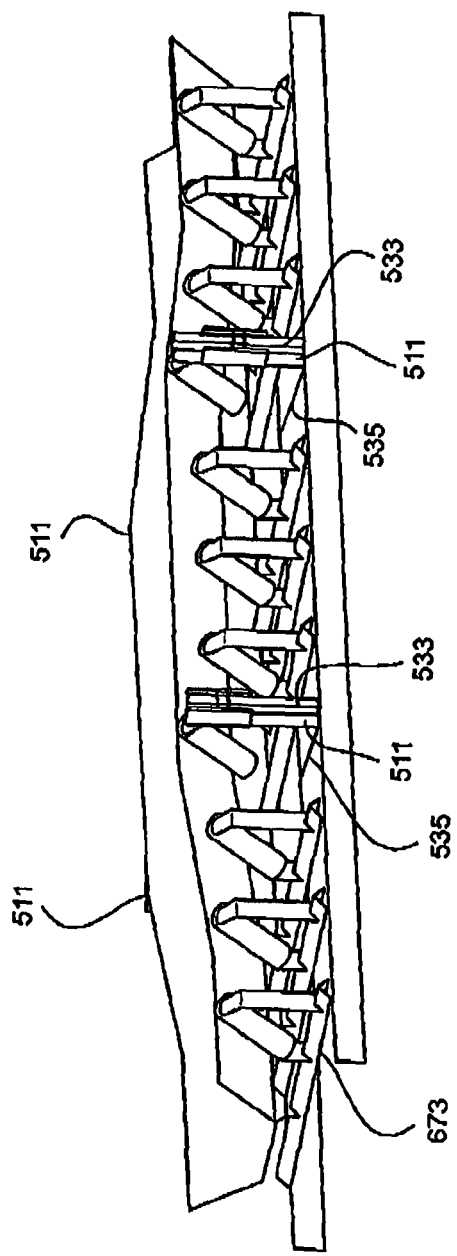
FIG. 19 is a similar view to FIG. 18 but with the support assemblies in a second position.

FIGS. 18 and 19 show a section of a conveyor with two support assemblies 511 of the seventh embodiment fitted (return lifter member 553 not shown). FIG. 18 shows the support assemblies 511 being used in the same manner as a conventional roller frame. FIG. 19 shows the support roller frame 513 raised to the second position whereby the belt is spaced from the rollers of the conventional roller frames 673, allowing an operator to access the rollers.

Modifications and variations such as would be apparent to the skilled addressee are considered to fall within the scope of the present invention.

Reference to positional descriptions, such as lower and upper, are to be taken in context of the embodiments depicted in the figures, and are not to be taken as limiting the invention to the literal interpretation of the term but rather as would be understood by the skilled addressee. For instance, the term lifting is to be taken to mean moving the belt away from the rollers and includes those variations whereby the belt is required to be moved downwardly away from the roller.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A support assembly for lifting a belt of a conveyor system, the conveyor system comprising rollers supported in a plurality of roller frames, the support assembly comprising:
    an attachment assembly to releasably secure a support member to a frame of the conveyor system, the support member having a first end and a second end;
    the attachment assembly comprising a lifting means to move the support member, whereby the first end and second end are raised in a synchronised manner such that the support member substantially maintains a constant angular orientation as it moves between a first position, wherein the support member is not in engagement with the belt, and a second position, wherein the support member supports the conveyor belt at a spaced distance from a plurality of roller frames located below the belt, allowing an operator to access rollers from the plurality of roller frames, the support assembly being able to lift a fully charged belt and wherein the support assembly is adapted to lift the belt while the belt is operating.

2. The support assembly according to claim 1 wherein the attachment assembly secures the support member relative to the stringers of the conveyor frame.

3. The support assembly according to claim 1 wherein the attachment assembly comprises an attachment means to lock the support member in place relative to the conveyor frame.

4. The support assembly according to claim 1 wherein the attachment assembly comprise a locking means to lock the support member in place when in the second position.

5. The support assembly according to claim 1 wherein the attachment assembly supports the support member when in the first position substantially in the same or below the horizontal plane of the stringers.

6. The support assembly according to claim 1 wherein the support assembly is fixed to the conveyor frame so as to remain in place at all times.

7. The support assembly according to claim 6 wherein the support member is in the form of a support roller frame comprising a similar array and configuration of rollers as the conventional roller frames of the conveyor to which the support assembly is fitted.

8. The support assembly according to claim 7 wherein the support member is positioned between the first position and second position whereby the support member is in engagement with the belt, supporting the conveyor belt in a similar manner to a conventional roller frame.

9. The support assembly according to claim 1 wherein there are two attachment assemblies, a first attachment assembly to attach a first end of the support member to a first stringer, and a second attachment assembly to attach a second end of the support member to a second stringer.

10. The support assembly according to claim 9 wherein a first lifting means of the first attachment assembly is associated with the first end of the support member, and a second lifting means of the second attachment assembly is associated with the second end of the support member.

11. The support assembly according to claim 9 wherein each attachment assembly is in the form of a support housing and a slidable member slidably supported in the support housing, each slidable member is slidably supported in its support housing whereby an end of the slidable member is attached to the support member, wherein when each slidable member is received in its respective support housing the support member is in the first position, and when the slidable member extends therefrom a predetermined length the support assembly is in the second position, the first and second positions corresponding to the first and second positions of the support member.

12. The support assembly according to claim 11 wherein each lifting means is activated by an activation means, whereupon activation of the activation means each lifting means reacts simultaneously to cause each slidable member to move relative to its support member such that the slidable member of each lifting means moves at the same time.

13. The support assembly according to claim 11 wherein the attachment assembly releasably secures the support member relative to the stringers of the conveyor frame.

14. The support assembly according to claim 11 wherein the locking means is in the form of a pin which is adapted to be received in at least one aperture when the slidable member is in its second position.

15. The support assembly according to claim 12 wherein each lifting means comprises a hydraulic ram.

16. The support assembly according to claim 12 wherein the activation means is in the form of a screw jack assembly.

17. The support assembly according to claim 12 wherein the activation means is in the form of a hydraulic system comprising a hydraulic pump.

18. The support assembly according to claim 17 wherein the hydraulic pump is in fluid communication with each hydraulic ram.

19. The support assembly according to claim 18 wherein the hydraulic pump incorporates a dual pump which delivers a metered volume of hydraulic fluid to each hydraulic ram, the hydraulic pump comprises a speed control valve to control in flow of fluid, wherein the hydraulic pump comprises a single motor which drives the dual pump.

20. The support assembly according to claim 17 wherein each slidable member incorporates or is provided by the hydraulic ram.

21. The support assembly according to claim 20 wherein the hydraulic ram may be removed from the slidable member for use in another slidable member.

22. The support assembly according to claim 20 wherein the hydraulic ram of the slidable member of the first attachment assembly comprises a double acting ram whereby fluid transfers into a first portion of the hydraulic ram causing the piston to move, whereby movement of the piston causes the hydraulic fluid in a second portion of the hydraulic ram to exit the second portion.

23. The support assembly according to claim 22 wherein the hydraulic rams of the first slidable member and the second slidable member are sized such that upon activation of the hydraulic pump, and subsequent transfer of hydraulic fluid, the ends of the support member move simultaneously.

24. The support assembly according to claim 22 wherein the hydraulic ram of the second slidable member is in fluid communication with the second portion of the hydraulic ram of the first slidable member, whereby fluid leaving the second portion of the hydraulic ram of the first slidable member causes the piston in the hydraulic ram of the second slidable member to move.

25. The support assembly according to claim 22 wherein the locking means locks the slidable member when in the second position, allowing the hydraulic ram to be removed.

26. The support assembly according to claim 22 wherein the first portion of the hydraulic ram of the first slidable member is in fluid communication with the hydraulic pump.

27. The support assembly according to claim 26 wherein the support member is lowered by the hydraulic pump causing the fluid to exit the first portion of the first slidable member, moving the piston, resulting in fluid transferring from the first portion of the second slidable member to the second portion of the first slidable member, causing the piston in the second slidable member to move simultaneously with the piston of the first slidable member.

28. A support frame assembly for lifting conveyor belts of a conveyor system, the assembly providing a permanently fixed roller frame of the conveyor system, the assembly comprising a first support means, a second support means and a support member extending therebetween, in use, arranged to be located on respective sides of a conveyor belt, each support means comprises
a support housing and a slidable member that is slidable relative to said support housing;
the slidable member being adapted to be attached to a roller support frame; and
fixing means for fixing said slidable member in an elevated position along said support housing wherein the support member is in an elevated position so as to support the conveyor belt in an elevated position;
wherein the respective support means are associated with a lifting means to lift each support means simultaneously and at substantially the same speed, the lifting means being able to lift a fully charged belt and wherein the lifting means is adapted to lift the belt while the belt is operating.

29. A support assembly for lifting a belt of a conveyor system, the conveyor system comprising rollers supported in a plurality of roller frames, the support assembly comprising:
an attachment assembly to releasably secure a support member to a frame of the conveyor system, the support member having a first end and a second end;
the attachment assembly comprising a first lifting device to move a first end of the support member, and a second lifting device to move a second end of the support member, whereby the support member moves between a first position, wherein the support member is not in engagement with the belt, and a second position, wherein the support member supports the conveyor belt at a spaced distance from a plurality of roller frames located below the belt, allowing an operator to access rollers from the plurality of roller frames, the support assembly being able to lift a fully charged belt and wherein the support assembly is adapted to lift the belt while the belt is operating;
wherein each lifting means is activated by an activation means in the form of a hydraulic system comprising a hydraulic pump,
wherein each lifting means comprises a hydraulic ram whereby each slidable member is provided by or incorporates the hydraulic ram;
wherein the hydraulic ram of the slidable member of the first lifting means comprises a double acting ram whereby fluid transfers into a first portion of the hydraulic ram causing the piston to move, whereby movement of the piston causes the hydraulic fluid in a second portion of the hydraulic ram to exit the second portion, the hydraulic ram of the second slidable member is in fluid communication with the second portion of the hydraulic ram of the first slidable member, whereby fluid leaving the second portion of the hydraulic ram of the first slidable member causes the piston in the hydraulic ram of the second slidable member to move, wherein upon operation of the hydraulic pump, hydraulic fluid enters the hydraulic ram of the first portion of the first slidable member, this results in movement of the piston, causing hydraulic fluid to exit the upper portion of the hydraulic ram and enter the first portion of the hydraulic ram of the second slidable member, wherein the hydraulic rams of the first slidable member and the second slidable member are sized such that upon activation of the hydraulic pump, and subsequent transfer of hydraulic fluid, the first end and second end are raised in a synchronised manner such that the support member substantially maintains a constant angular orientation as it moves between the first position and the second position.

* * * * *